US009921951B2

(12) United States Patent
Rauenzahn et al.

(10) Patent No.: US 9,921,951 B2
(45) Date of Patent: Mar. 20, 2018

(54) OPTIMIZATIONS FOR REGRESSION TRACKING AND TRIAGING IN SOFTWARE TESTING

(71) Applicant: VMware, INC., Palo Alto, CA (US)

(72) Inventors: Richard Rauenzahn, Palo Alto, CA (US); Michael Wenig, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 134 days.

(21) Appl. No.: 15/175,519

(22) Filed: Jun. 7, 2016

(65) Prior Publication Data
US 2017/0351598 A1   Dec. 7, 2017

(51) Int. Cl.
G06F 9/44 (2006.01)
G06F 11/36 (2006.01)

(52) U.S. Cl.
CPC ............... G06F 11/3688 (2013.01)

(58) Field of Classification Search
CPC .................................. G06F 11/3688
USPC ......................................... 717/128
See application file for complete search history.

(56) References Cited

U.S. PATENT DOCUMENTS

| | | | | |
|---|---|---|---|---|
| 9,032,371 | B2 * | 5/2015 | Hansson | G06F 11/3692 714/38.1 |
| 9,378,124 | B1 * | 6/2016 | dos Santos | G06F 11/3688 |
| 2002/0059426 | A1 * | 5/2002 | Brinkerhoff | G06F 5/06 709/226 |
| 2008/0115107 | A1 * | 5/2008 | Arguelles | G06F 9/5027 717/124 |
| 2008/0134209 | A1 * | 6/2008 | Bansal | G06F 11/3612 719/317 |
| 2015/0052100 | A1 * | 2/2015 | Calkowski | G06F 17/3023 707/608 |

(Continued)

FOREIGN PATENT DOCUMENTS

WO   WO 2016138953 A1 *   9/2016   ............ G06F 11/368

OTHER PUBLICATIONS

Beszédes et al., "Code Coverage-Based Regression Test Selection and Prioritization in WebKit", 2012, IEEE.*

(Continued)

*Primary Examiner* — Wei Zhen
*Assistant Examiner* — Junchun Wu
(74) *Attorney, Agent, or Firm* — Thomas Horstemeyer, LLP

(57) ABSTRACT

An example system configured to perform regression tracking and triaging includes a processor and memory coupled with the processor. The memory is configured to provide the processor with instructions to schedule the testing of a first list of equidistant revisions associated with a software application. The memory is configured to provide the processor with instructions to schedule the testing of a second list of equidistant revisions associated with the software application. The memory is further configured to provide the processor with instructions to, for a first revision selected from the first list of equidistant revisions and a second revision selected from the second list of equidistant revisions, upon a determination that an equidistance between the first revision and the second revision is below a predetermined threshold, test the second revision using a first build generated based on the first revision, wherein the first build is executable by the processor.

15 Claims, 6 Drawing Sheets

(56) References Cited

U.S. PATENT DOCUMENTS

2015/0379092 A1* 12/2015 Becker ................ G06Q 10/101
707/769
2016/0232079 A1* 8/2016 dos Santos ......... G06F 11/3688
2016/0342720 A1* 11/2016 Veneris ............... G06F 17/5045

OTHER PUBLICATIONS

Williams et al, "Multi-robot Boundary Coverage with Plan Revision", May 2006, IEEE.*
Cheng et al., "Scheduling a single batch-processing machine with non-identical job sizes in fuzzy environment using an improved ant colony optimization", Jul. 2010, Elsevier.*
D'Amico et al. "Applying Contextual Design to Build a Course Scheduler—A Case Study", Jan. 2003, Auburn University.*

* cited by examiner

```
ok = desired_equidistance * C
candidates = []
for ideal in IdealList:
    # find all in HaveList with acceptable equidistance
    choices = filter(lambda have: abs(ideal - have) <= ok, HaveList)
    if not len(choices):   # Could not find any close enough...
        choices = (ideal,)  # we have to build it.
    candidates.append(choices)
```

Sample Code
210

```
def variance(values, desired_distance):
    pairs = zip(values, values[1:])   # [1, 2, 3, 4, 5, 6] ->
                                      # [(1, 2), (2, 3), (3, 4), (4, 5), (5, 6)]
    return sum(lambda pair: (abs(pair[0] - pair[1]) - desired_distance)**2, pairs)

# ideal_distance = 7 for the example in the specification
cartesian_product = itertools.product(*candidates) # [ (1,2), (3, 4) ] ->
                                                   # [ (1,3), (1,4), (2,3), (2, 4) ]

# Initialize with first list of choices.
best = cartesian_product.next()              # Retrieve next sequence
best_variance = variance(best, ideal_distance)  # Calculate variance of sequence

# Find the list of choices that has the smallest variance.
for choices in cartesian_product:
    var = variance(best, ideal_distance)
    if var < best_variance:
        best = choices
        best_variance = var
```

Sample Code
220

FIGURE 2

```
# next_build
def next_build(Revisions):
    highest_passed
        = max(filter(lambda x: Revisions[x].is_passed(), range(Revisions)))
    lowest_regressed
        = min(filter(lambda x: Revisions[x].is_regressed(), range(Revisions)))
    if highest_passed - lowest_regressed == 1:
        raise SearchFinished()
    return int((lowest_regressed + highest_passed) / 2)  # Find Revision in the middle pre_fetch
next = next_build(Revisions)
C = copy(Revisions)

try:
    C[next].is_passed = lambda: return True
    C[next].is_regressed = lambda: return False
    prefetch = next_build(C)
    queue_build(C[prefetch])
except SearchFinished:
    pass try:
    C[next].is_passed = lambda: return False
    C[next].is_regressed = lambda: return True
    prefetch = next_build(C)
    queue_build(C[prefetch])
except SearchFinished:
    pass
```

FIGURE 4

OPTIMIZATIONS FOR REGRESSION TRACKING AND TRIAGING IN SOFTWARE TESTING

BACKGROUND

In automated software testing, identifying software regressions typically involves the running of one or more test cases periodically against a set of builds created from the "Top-of-Tree" (ToT) revisions in a source code repository. In order to determine if functional (e.g. a failure) and non-functional (e.g. a drop in performance) regressions have occurred, test results may be compared to an expected set of results or against the results of a previous run of the test cases. Depending on the time between two consecutive runs of the test cases, there may be a significant number of revisions associated with the set of builds used by the test cases. Regression identification is to determine which revision between the last "good" revision and the first "bad" revision is responsible for the regression. There are a number of conventional approaches that can be applied to solve this "triaging" problem, including reading the change descriptions, dump analysis, statistics analysis, and log file inspection. However, these conventional approaches are time and/or resource intensive when a large number of revisions are involved.

SUMMARY

Optimizations to methods and systems to provide regression tracking and triaging are described. An automated system for regression tracking and triaging may rely on the use of binary searches to identify a revision that causes a regression. The depth of binary searches can be minimized by using equidistant revisions in the tracking process. In case of multiple parallel tracking processes, optimizing the selection of builds across the multiple equidistant revision ranges involved for re-use will yield significant savings in the number of builds required. In case of complex software applications with long build times, the pre-fetching of builds during a binary search process may significantly reduce the time of the process to complete.

BRIEF DESCRIPTION OF THE DRAWINGS

FIG. 2 illustrates sample source codes associated with determining candidate revisions for reusing builds during regression triage, according to one or more embodiments of the present disclosure.

FIG. 4 illustrates sample source codes associated with prefetching builds during regression triage, according to one or more embodiments of the present disclosure.

DETAILED DESCRIPTION

Figure 1:
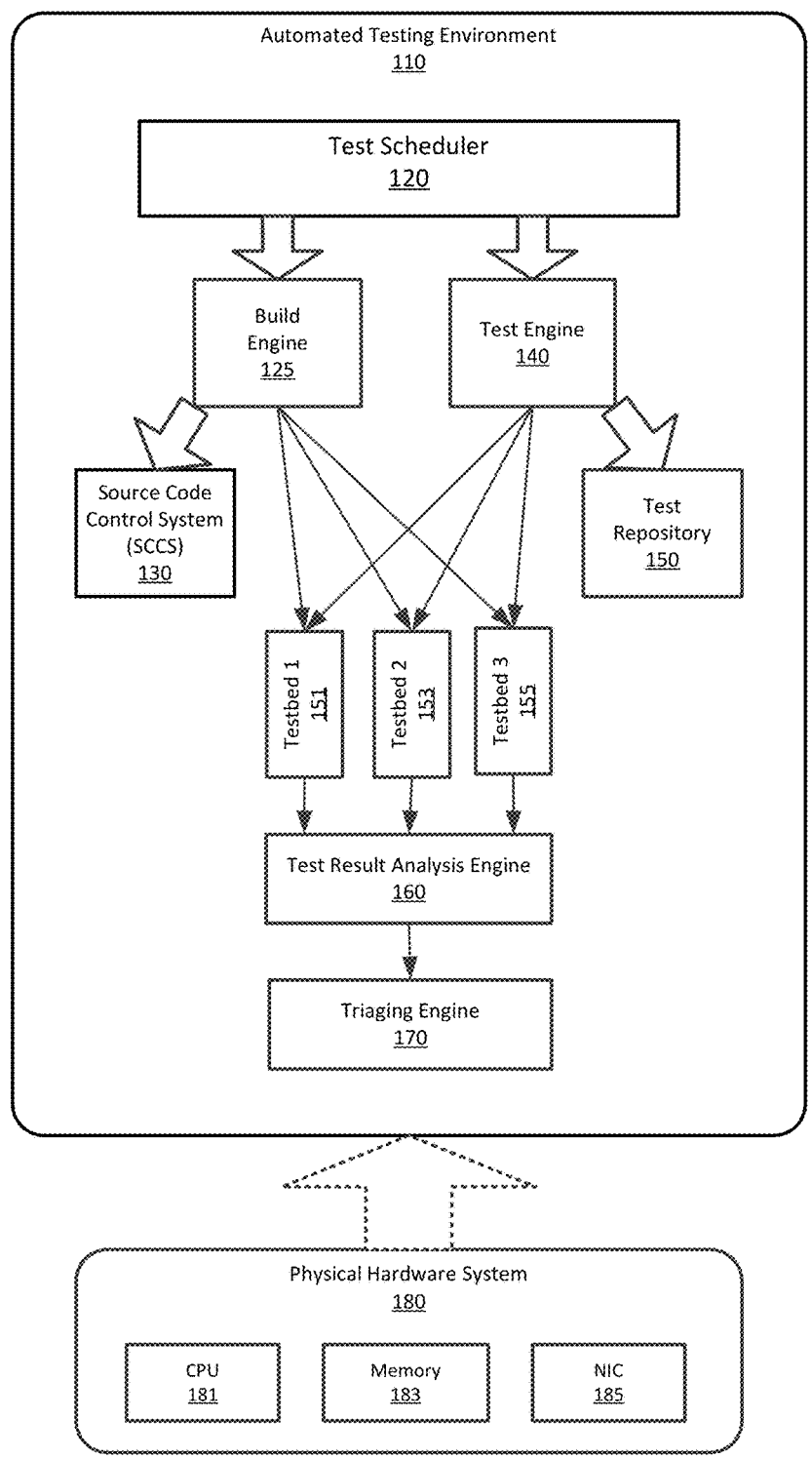
FIG. 1 illustrates a block diagram of an automated software testing environment that implements optimized tracking and triaging processes for detecting functional and non-functional regressions in large-scale software development environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure provides system and methods to improve and optimize the tracking and triaging processes for functional and non-functional regressions in large complex software environments. The system and methods deliver significant economies of scale in parallel regression tracking as well as significantly shorter triaging cycles. Specifically, the system and methods may conduct the software testing across multiple equidistant revisions, while sharing builds of those revisions that have close distance. Further, the system and methods may further improve performance by prefetching builds during a regression search.

FIG. 1 illustrates a block diagram of an automated software testing environment that implements optimized tracking and triaging processes for detecting functional and non-functional regressions in large-scale software development environment, according to one or more embodiments of the present disclosure. In FIG. 1, an automated software testing environment 110, which may be constructed based on a physical hardware system 180, may be configured with, without limitation, a test scheduler 120, a build engine 125, a Source Code Control System (SCCS) 130, a test engine 140, a test repository 150, a test result analysis engine 160, and a triaging engine 170. It should be recognized that the various terms, layers and categorizations used to describe the components in FIG. 1 may be referred to differently without departing from their functionalities or the spirit and scope of the present disclosure. For example, the test scheduler 120 and the test engine 140 may be located in one physical hardware system 180, while the SCCS 130 and the test repository 150 may be deployed on another physical hardware system 180.

In some embodiments, the physical hardware system 180 may be configured with, without limitation, a Central Processing Unit (CPU) 181, memory 183, a Network Interface Card (NIC) 185, and/or additional electronic circuit components not shown in FIG. 1. The CPU 181 may be a general-purpose or specialized computing processor having electronic circuitry to perform arithmetical, logical, and input/output operations for the physical hardware system 180. The CPU 181 may be configured to accelerate the processing of the SCCS 130 and the test repository 150. The CPU 181 may be configured to support functions of the test scheduler 120, the test engine 140, the test result analysis engine 160, and/or the triaging engine 170. The CPU 181 may also be configured to utilize the physical memory 183 to store or retrieve tests and test results. The memory 183 may be hardware storage devices having integrated circuits for storing information used in the automated software testing environment 110. The memory 183 may be volatile memory (e.g., dynamic random-access memory (DRAM) or CPU cache memory) and non-volatile memory (e.g., hard drive or flash memory). In some embodiments, the memory 183 may be non-transitory computer-readable storage medium, containing a set of instructions which, when executed by the CPU 181, cause the CPU 181 to perform a method for regression tracking and triaging. The NIC 185 may be network communication hardware for transmitting messages among the various components (e.g., the test scheduler 120, the test engine 140) within, or delivering messages in and out of, the automated software testing environment 110.

In some embodiments, the test scheduler 120 may be configured to control and schedule the overall automated testing of a large-scale software application. During software development, the source code of the software application may undergo a large number of "revisions" (or "changes") for debugging and enhancements purposes. The SCCS 130 may be a source code revision system to track and control these revisions of the software application. Each "revision" of the software application may be deemed a specific version of the source code of the software application, and can be preserved in the SCCS 130 for future reference. A later revision may have one or more updates (e.g., adding, altering, or deleting) applied to an earlier revision of the software application. The SCCS 130 may also store build tools (e.g., makefiles, etc) for building an executable form of the software application.

In some embodiments, the test repository 150 may be a database configured to store/retrieve test cases for testing the software application. A "test case" may be a set of commands/procedures that can be automatically executed against a specific revision of the software application. The test case may also include a set of predicted results/outcomes, which can be compared with the actual results/outcomes generated by executing these commands/procedures during runtime. When the actual results/outcomes are not the same as the predicted results/outcomes, the test case may generate a "regression test result", indicating there are functional or non-functional regressions in the specific revision of the software application. Different test cases may be designed to test different aspects of the same revision of the software application. For example, a first test case may be configured to test the software application's network communication functions, while a second test case may be configured to evaluate the graphic user interface of the software application. The test repository 150 may also contain test metadata (e.g., expected run times, etc) and other test related information.

In some embodiments, the test scheduler 120 may control the build engine 125 and the test engine 140 to perform automated testing of the software application. Based on the test scheduler 120's instruction, the test engine 140 may configure multiple testbeds (e.g., Testbed 151, Testbed 153, and Testbed 155) for testing the different revisions of the software application in parallel. A "testbed" (or "test bed") may be an independent or isolated platform/environment for executing and repeating a test case against a particular revision of the software application. For example, a testbed may be an independent computer (or a sub-directory under a computer) having necessary hardware/software configurations for building and executing the software application. In a specific testbed, the test scheduler 120 may schedule a specific test case to be executed on a specific revision of the software application. The test scheduler 120 may simultaneously schedule multiple different test cases in these testbeds, or schedule the same test case to be executed in-parallel in these testbeds against different revisions of the software application.

In some embodiments, based on the instructions from the test scheduler 120, the build engine 125 may load into a testbed a particular revision of the software application (as well as its related build tools) from the SCCS 130, and start building the particular revision of the software application in the testbed. "Building" refers to a process to generate an executable form of the software application from a revision of source code using build tools. Depending on the nature and form of the source code, the build engine 125 may perform compilation, linking, and/or coordinating operations. The generated executable form of the software application may be referred to as a "build" of the particular revision of the software application. During software testing, test engine 140 may retrieve a test case from the test repository 150, and execute the test case against a specific build of the software application in the testbed. The test engine 140 may then monitor the execution of the test case, and transmit the results/outcomes of the test case to the test result analysis engine 160 for further processing.

In some embodiments, the test result analysis engine 160 may compare the predicted test results/outcomes associated with the test case with the actual test results generated during the executing of the test case. Based on the test result comparison, the test result analysis engine 160 may detect whether there is any functional or non-functional regression in this revision of software application currently being tested in the testbed ("tested revision"). For functional regression (e.g., a bug), the test result analysis engine 160 may document the details of the bug for debugging purposes. For non-functional regression, such as performance degrading, the test result analysis engine 160 may further utilize the triaging engine 170 to identify the cause of such regression. The term "triaging" may refer to a process to identify a regression revision associated with the detected regression. The "regression revision" may refer to the earliest revision of the software application which has the first occurrence of the identified regression. In other words, no revision earlier than the regression revision will have the symptoms of the identified regression, and all revisions subsequent to the regression revision may have symptoms of the identified regression. Once the regression revision is identified, a debugging process may determine the cause of the regression by evaluating the source changes made in the regression revision. For simplicity purpose, the creating of a particular build for a revision of the software application, the executing of a test case on the particular build, the analyzing of the results/outcomes of the test case, and the identifying of the regression may collectively be referred to as a "testing task."

In some embodiments, if the test result analysis engine 160 detects a regression in a tested revision, the triaging engine 170 may initiate a recursive binary search to identify the regression revision based on the tested revision. The triaging engine 170 may conduct the binary search across a "revision range", which is between the last known non-regressed revision and the tested revision that is showing regression. Given a revision range of [x, y], wherein x is the last non-regressed revision, and y is the tested revision, the triaging engine 170 may select a revision in the middle of the revision range (e.g., revision (y−x)/2), and perform a testing task on this middle revision. If this testing task shows that the same regression exists in the middle revision, it means the regression revision may be earlier than the middle revision. In other words, the regression revision may be within the narrowed revision range of [x, (y−x)/2]. If the testing task does not show the same regression, it means the regression revision may be later than the middle revision. In other words, the regression revision should be within the narrowed revision range of [(y−x)/2, y]. Afterward, the triaging engine 170 may select a new middle revision from the narrowed revision range, and perform the next iteration of the recursive binary search process similar to the process shown above. The triaging engine 170 may perform multiple iterations of the recursive binary search until two adjacent revisions produce non-regression and regression results. In this case, the one showing regression result may be deemed the regression revision.

In some embodiments, the binary search may have a depth of $\log_2(N)$, where N is the number of revisions to search. Binary search becomes expensive when the number of revisions is large. For example, if there are more than 1000 revisions to search through, then the depth of the binary search may be 9, meaning the triaging engine 170 may take 9 iterations of recursive binary search and testing to identify the regression revision. If the triaging engine 170 repeats the test case three times for each revision in order to be certain of the existence of the regression, and each testing task may take an hour to complete, then the total run time to complete the binary search and identify the regression revision may exceed 27 hours.

Furthermore, if the test scheduler 120 always schedules testing tasks based on the most recent revision of the software application, the number of revisions between the most-recent revision and the last-tested revision may fluctuate, since the check-in rates are typically non-uniform depending on different times of the day. For example, during peak check-in time period (e.g., 9 AM-9 PM), software developers may check-in more revisions into the SCCS 130 than during the non-peak check-in time period (e.g., 9 PM-9 AM). As a result, the above binary search of the regression may encounter more revisions and have to go through more rounds of testing during the peak check-in time period. In comparison, during the non-peak check-in time period, the automated testing environment 110 may be less utilized since there are not many revisions to test.

In some embodiments, instead of scheduling testing tasks along with the software development cycle, the test scheduler 120 may first accumulate a number of revisions during a predetermined period of time (a "test cycle"), and schedule the testing tasks based on a number of equidistant revisions selected among the accumulated revisions in the test cycle. For convenience purposes, within a specific test cycle, each revision of the software application may be identified by a number, which represents the position of the revision in the order of the accumulated revisions being checked into the SCCS 130. For example, revision 15 may correspond to the 15$^{th}$ checked-in revision during a particular test cycle, meaning revision 15 is checked-in after revision 14 and before revision 16.

The term "distance" may refer to a difference between the positions of two revisions that are checked into SCCS 130. For example, revision 7 may have a distance of −3 from revision 4, and a distance of 5 from revision 12. The term "equidistance" may refer to a common/identical distance between each pair of two adjacent revisions among a set of revisions. For example, revisions 5, 10, 15, and 20 may have an equidistance of 5, since the distance between every two adjacent revisions (e.g., revisions 5 and 10, revisions 15 and 20, etc) is the same number of 5. In comparison, revisions 4, 9, and 11 may not have an equidistance, as there is no common identical distance among all adjacent revision pairs. Further, "equidistant revisions" may refer to a list of revisions having an equidistance. The equidistance may also be referred to as a common factor, as the equidistance revisions may have their respective revision numbers dividable by the common factor: the value of the equidistance.

In some embodiments, since triaging across a larger number of revisions may require more iterations of binary search, it is advantageous to have a uniform number of revisions for triaging throughout a test cycle. This way, each testing task conducted during the test cycle may encounter the same number of revisions, may have a more predictable number of revisions to binary search through, and will take approximately the same amount of time to complete. Once the time required by each testing task is known, the test scheduler 120 may schedule the testing tasks across the test cycle to ensure a balanced and maximized utilization of the automated testing environment 110. Thus, the test scheduler 120 may determine the total number of the revisions checked-in during a test cycle, estimate the time required for conducting a testing task, and schedule a list of equidistant revisions based on the total number of revisions and the estimated time.

For example, if the total number of revisions check-ins during a 24-hour test cycle is 600, and a testing task may require 2 hours to complete, then the test scheduler 120 may schedule 12 tests per day. In this case, the test scheduler 120 may schedule a list of equidistant revisions containing 12 revisions and having an equidistance of 50 (such as [50, 100, 150, 200, 250, 300, 350, 400, 450, 500, 550, 600]). In other words, the test scheduler 120 may initiate testing tasks first on revision 50, then on revision 100, and so on. If the test result analysis engine 160 identifies a regression not in revision 50, but in revision 100, the triaging engine 170 may perform its triaging process based on a revision range of [50, 100]. The triaging engine 170 may then identify the regression revision through 5 iterations of binary search between revision 50 and revision 100. Thus, the above equidistant revision approach may ensure that the triaging engine 170 would not encounter fluctuating numbers of revisions for binary search. Further, the idle capacity of the automated testing environment 110 during the none-peak check-in period, such as at night, may be fully utilized.

In some embodiments, the test scheduler 120 may schedule multiple lists of equidistant revisions, each of which have different corresponding equidistance, at the same time. For example, the test scheduler may schedule a first list of equidistant revisions having an equidistance of 7 for testing in Testbed 1, and schedule a second list of equidistant revisions having an equidistance of 7 for testing in Testbed 2. The test scheduler 120 may then instruct the test engine 140 to allocate the necessary testbeds and generate builds for these lists of equidistance revisions. Further, the test scheduler 120 may optimize the testing by sharing builds among the different lists of equidistant revisions.

For example, assuming 96 revisions were checked into the SCCS 130 during the last test cycle, and a first testing task may take an hour to complete on Testbed 1, then the test scheduler 120 may schedule a first list of equidistant revisions having 24 revisions and an equidistance of 4 (i.e. 96/24). Assuming a second testing task may take 1.5 hours to complete on Testbed 2, then the testing scheduler 120 may schedule a second list of equidistant revisions having 16 (i.e. 24/1.5) revisions and an equidistance of 6 (i.e. 96/16). In this case, the two lists of equidistant revisions may share some builds for those revisions with numbers that can be dividable by both equidistance 4 and equidistance 6 (e.g., revisions 12, 24, 36, 48, 60, 72, 84, and 96). In other words, a build created for a revision with number that is dividable by a common factor of 12 may be shared by the first testing task in Testbed 1 and the second testing task in Testbed 2. While the build engine 125 may pipeline builds to reduce wait time and the test engine 140 may perform parallel testing to increase speed, sharing the builds when possible may further enhance the utilization the resources of the automated testing environment 110.

FIG. 2 illustrates sample source codes associated with determining candidate revisions for reusing builds during regression triage, according to one or more embodiments of the present disclosure. A test scheduler (similar to the test scheduler 120 of FIG. 1) may be configured to schedule multiple test tasks executing on different testbeds. Assuming in a test cycle which contains 40 revisions of the software application, based on the resources available and testing requirements, the test scheduler may schedule a first list of equidistant revisions having an equidistance of 5 for Testbed A, schedule a second list of equidistant revisions having an equidistance of 7 for Testbed B, schedule a third list of equidistant revisions having an equidistance of 3 for Testbed C, and schedule a fourth list of equidistant revisions having an equidistance of 8 for Testbed D. The following is a table showing all the lists of equidistant revisions scheduled on different testbeds.

TABLE 1

Testbed A: 5, 10, 15, 20, 25, 30, 35, 40
Testbed B: 7, 14, 21, 28, 35
Testbed C: 3, 6, 9, 12, 15, 18, 21, 24, 27, 30, 33, 36, 39
Testbed D: 8, 16, 24, 32, 40

In some embodiments, the test scheduler may transmit the lists of equidistant revisions shown in Table 1 above along with their associated testing tasks and testbeds information (together "scheduled testing task list") to a test engine (e.g., similar to the test engine 140 of FIG. 1), and instruct the test engine to start these testing tasks. Upon receiving the instruction and the scheduled testing task list, the test engine may allocate the testbeds, assign the lists of equidistant revisions to their respective testbeds, and request a build engine (e.g., similar to the build engine 125 of FIG. 1) to create the builds for the lists of equidistant revisions. For example, on Testbed A, the build engine may schedule the creating of builds according to the order of the revisions in the list of equidistant revisions associated with Testbed A. In other words, the build engine may start to create (or queue the creating of) builds for revisions 5, 10, 15, 20, 25, 30, 35, and 40 sequentially.

In some embodiments, the test scheduler may maintain a "HaveList" which contains the revisions having builds that are either already built ("created") or queued for building during a test cycle. In other words, once the test engine started the testing of the first list of equidistant revisions on Testbed A, all the revisions in the first list of equidistant revisions may have builds that are either created or queued for building. Thus, the HaveList may contain revisions 5, 10, 15, 20, 25, 30, 35, and 40. Subsequently, when the test engine starts the testing of the second list of equidistant revisions assigned to Testbed B, it may try to reuse some of the builds already available in according to the HaveList. For example, the test engine may notice that the second list of equidistant revisions may include a revision 35, which is on the HaveList. In this case, when the testing task on Testbed B is ready to test revision 35, it may reuse the build for the revision 35, which should have been built before revision 35 was tested on Testbed A.

In some embodiments, when conducting the testing tasks for a particular testbed, the test engine may first generate one corresponding HaveList for this particular testbed. The HaveList may include all builds that are already built or queued for building, which can be determined based on the equidistant revisions that are scheduled in the testbeds. Alternatively, the test scheduler may monitor the builds that are built or queued for building. In other words, when the test scheduler scheduled a set of equidistant revisions for one testbed, it may add this set of equidistant revisions into an internal master list. When the build engine finished creating a build for a particular revision, it may also notify the test scheduler, so that the test scheduler may update the internal master list with information associated with the build. When the test scheduler schedules equidistant revisions for a new testbed, it can quickly generate a corresponding HaveList for the new testbed based on this internal master list. The builds in the HaveList may be reusable by testing tasks running on this new testbed.

In some embodiments, for some of the equidistant revisions assigned to Testbed B, the test engine may notice that even though there are no identical revisions in the HaveList, some of the revisions in the HaveList may be close enough. For example, with respect to revision 21 assigned to Testbed B, revision 20 assigned to Testbed A may already have builds available. In this case, the test engine may be willing to reuse revision 20's build, instead of generating a new build for revision 21. Similarly, the revision 6 assigned to Testbed C and revision 8 assigned to Testbed D may be close enough to revision 7 assigned to Testbed B, and revision 16 assigned to Testbed D may be close enough to revision 14 assigned to Testbed B as well. Reusing builds for revisions that are close enough in number would not greatly affect the triaging process. For example, a binary search through 5 revisions and a binary searching through 7 revisions may have the same search depth of 3, thereby requiring the same number of iterations to identify the regression revision.

In some embodiments, the test engine may utilize a trimming process to identify and select the reusable builds in the HaveList. The test engine may define a "trimming variable" C to adjust the amount of equidistance it is willing to compromise in order to reuse builds. The test engine may further define a "trimming distance" (or "predetermined threshold") calculated by multiplying the trimming variable with the corresponding equidistance. For example, for equidistant revisions in Testbed B which have an equidistance of 7, the trimming variable C may have a value 0.5, and the trimming distance for Testbed B may be ±7×0.5=±3.5. Thus, any revisions in the HaveList that are within ±3.5 distance of a particular revision assigned to Testbed B, may be a candidate for build reuse. Thus, for revision 7 assigned to Testbed B, the revision number after applying the trimming distance may have a range of 3.5-10.5. In other words, revisions in the HaveList that are within this range of 3.5-10.5 (e.g., revisions 5 and 10) may be candidate revisions for revision 7's build reuse. Thus, the trimming variable and the trimming distance may be used to balance the desire to reuse as many builds as possible, and the costs of having too many reusable builds to choose from.

In FIG. 2, sample source code 210 illustrates an example software code for determining a set of build-reusable candidate revisions. In the sample code 210, which is executable by the test scheduler or test engine, the variable "IdealList" may contain a set of revisions originally assigned to Testbed B, as indicated by Table 1 above. In other words, IdealList may refer to a list of revisions seeking reuse-able builds from the HaveList. Assuming the following HaveList contains revisions with builds either completed or scheduled, and the following IdealList contains revisions seeking reusable builds:

TABLE 2

HaveList = [5, 10, 13, 15, 20, 25, 30, 35, 40]
IdealList = [7, 14, 21, 28, 35]

The sample code 210 may process each "ideal-revision" in the IdealList, and evaluate the distance between the ideal-revision and one of the "have-revisions" in the HaveList. If the distance between the ideal revision and a have-revision is smaller than the trimming distance (represented by variable "ok" in sample code 210), then the ideal-revision may be deemed a candidate-revision, and added to a "CandidateList" (represented by variable "candidates" in the sample code 210). In other words, each candidate in the CandidateList may be a revision in HaveList having a build that can be reused in lieu of an ideal-revision in the IdealList.

In some embodiments, the sample code 210 may process the IdealList in the above Table 2, and generate the CandidateList as shown in Table 3 below:

TABLE 3

CandidateList = [(5, 10), (13, 15), (20), (30), (35)]

In this example, for revision 7 in the IdealList, the sample code 210 may identify two candidates (or "choices") 5 and 10 having distances of −2 and +3 from revision 7 that are below the trimming distance of ±3.5. For revision 14 in the IdealList. The sample code 210 may identify two candidates 13 and 15 having distances of ±1 from revision 14 that are below the trimming threshold of ±3.5. The revisions 5 and 10 may be referred to as a "tuple of candidate revisions" for the ideal-revision 7. For revisions 21, 28, and 35 on the IdealList, the sample code 210 may identify candidate 20, candidate 30, and candidate 35 from the HaveList for build reusing, respectively. Since all revisions in the IdealList find build candidates in the HaveList, there is no need to queue any new builds to the HaveList for Testbed B, and the test engine may utilize the builds of these candidates in the above CandidateList of Table 3 in lieu of creating builds based on the IdealList. If some revisions in the IdealList didn't find build candidates in the HaveList, the test engine may include these revisions in the HaveLists subsequent created for testing tasks on Testbed C and Testbed D.

Based on the CandidateList in the above Table 3, the test engine may select the build for either candidate 5 or candidate 10 when it was ready to test revision 7. Likewise, the test engine may select the build for either candidate 13 or candidate 15 when it was originally scheduled to test revision 14. Still, the test engine can only select one revision from one tuple of candidate revisions for build reuse. Thus, the test engine should optimally select revisions from multiple tuples of candidate revisions in order to ensure evenly-distributed distances among the selections. In some embodiments, the test engine may perform sample code 220 to generate a list of "optimal revisions" based on the candidate list. A list of "optimal revisions" should have the least variance from the equidistance associated with the IdealList.

In some embodiments, the test engine may execute the sample code 220 in order to find a list of optimal revisions corresponding to the ideal-revisions in the IdealList. Specifically, the test engine may use a Cartesian product (e.g., all permutations) of the candidate list in order to select the optimal revisions that have the least variance in view of the equidistance in the IdealList ("ideal equidistance"). In other words, the test engine may first generate permutations based on all the candidates in the candidate list. For each permutation of candidates, the test engine may calculate its deviation from the ideal equidistance. "Deviation" may refer to the sum of the squares of the variance amounts by which permutations differ from the ideal equidistance. The permutation with the least deviation from the ideal equidistance among all the candidate permutations may be deemed a list of optimal revisions.

In FIG. 2, the sample code 220 may first generate the Cartesian product (represented by variable "cartesian_product") based on the candidates in the above Table 2. The cartesian-product, which contains 4 permutations of candidates, may be shown in Table 4 below:

TABLE 4

Cartesian_product =
[[(5), (13), (20), (30), (35)],
[(5), (15), (20), (30), (35)],
[(10), (13), (20), (30), (35)],
[(10), (15), (20), (30), (35)]]

Afterward, the sample code 220 may iterate through each of the 4 permutations, and calculate a variance "var" based on the ideal distance (represented by variable "ideal_distance" in Sample Code 220) of 7. In other words, for each two adjacent candidates (represented by variable "pair" in Sample Code 220) in the permutation, the sample code 220 may calculate their distance, and generate a variance value by comparing their distance against the ideal distance. If the sum of all variance values for all the pairs in a particular permutation is the least, then such permutation may be deemed having candidates that deviate the least from the ideal distance, and be deemed the optimal revisions (represented by variable "best-choices" in Sample Code 220). In the above example, the test scheduler may execute the Sample Code 220 and determine that the permutation [5, 13, 20, 30, 35] may be the list of optimal revisions, and utilize this list of optimal revisions in lieu of the IdealList when performing the testing task on Testbed B.

Figure 3:
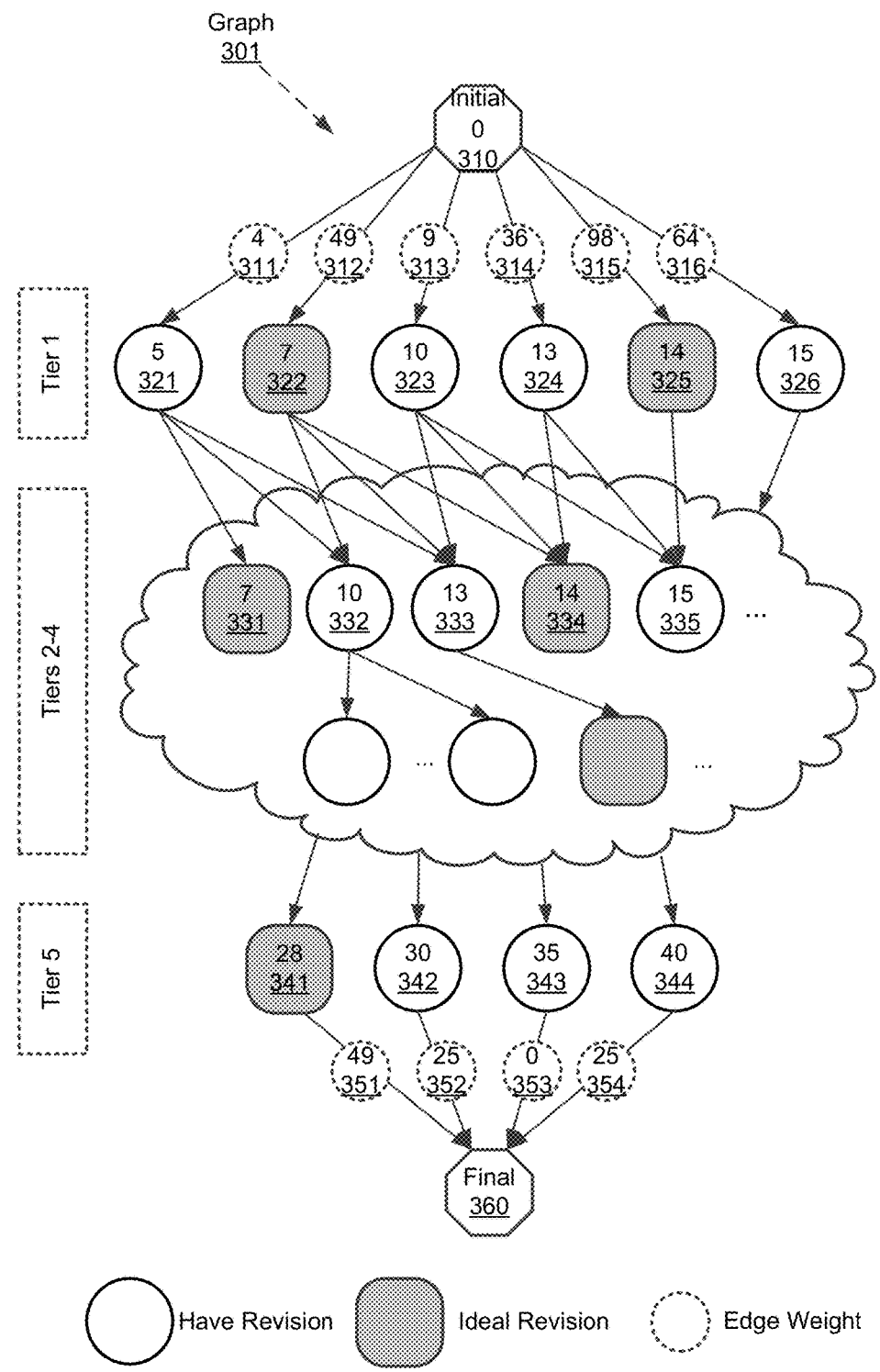
FIG. 3 illustrates a graph used in selecting optimal revisions from candidate revisions for build-reusing during regression triage, according to one or more embodiments of the present disclosure.

FIG. 3 illustrates a graph used in selecting optimal revisions from candidate revisions for build-reuse during regression triage, according to one or more embodiments of the present disclosure. In the above Cartesian product approach, the number of permutations may be exponential when the number of ideal-revisions in the IdealList and the number of candidates for each revision in the IdealList become large. In some embodiments, the test scheduler may construct a directed graph for determining candidate revisions and selecting optimal revisions. In the directed graph, each vertex may represent a revision selected either from the HaveList or the IdealList. In graph 301's example, the vertices associated with revisions in the HaveList may be represented by circles (e.g., 321), and the vertices associated with revisions in the IdealList may be represented by squares (e.g., 322). Further, each vertex in graph 301 may be marked using the revision number that is associated with the vertex. For example, the number "5" marked on the circle 321 indicates vertex 321 representing revision 5 in the HaveList, and the number "7" marked on the square 322 indicates vertex 322 representing revision 7 in the IdealList.

In some embodiments, the test scheduler may start the construction of the graph 301 by creating an "initial vertex" 310 to act as a common ancestor for all other vertices. Afterward, the test scheduler may build one tier of vertices for each one of the revisions in the IdealList. The vertices in each tier may represent the candidates for each of the revisions in the IdealList. Afterward, the test scheduler may finalize the construction of the graph 301 by creating a "final vertex" 360 to act as a closing point for vertices from the last tier. Using the HaveList and IdealList in Table 2 above as examples, the test scheduler may construct five tiers of vertices for the five revisions in the IdealList. The vertices in the tier 1 may represent candidates for providing builds to the first revision (revision 7) in the IdealList, the vertices in the tier 2 may represent candidates for providing builds to the second revision (revision 14) in the IdealList, and so on.

In some embodiments, the test scheduler may use directed edges to connect the vertices in one tier with other vertices in a subsequent tier. As shown in FIG. 3, each directed edge may be a line connecting from a first vertex in one tier to a second vertex in the subsequent tier. In other words, an edge may be used to indicate that a first revision (represented by the first vertex) shall be tested before a second revision (represented by the second vertex). The test scheduler may use edges to connect the initial vertex with all vertices in the first tier, and use edges to connect all vertices in the last tiers with the final vertex. Therefore, each vertex on one tier must have edge connecting either with one or more vertices on a subsequent tier, or with the final vertex. Based on the above criteria, any vertex that does not connect with another vertex or with the final vertex needs to be removed from the graph 301.

In some embodiments, the test scheduler may assign a "weight" to each edge in the graph 301, indicating the closeness of the equidistance between the two connected vertices with respect to the ideal distance. Specifically, the test scheduler may utilize the following cost function to calculate the weight for a specific edge. Assuming u and v represent two vertices that are connected by the specific edge, and desired represents the ideal distance, the cost function to determine the weight for the specific edge between u and v may be:

$$\mathrm{cost}(u,v) = (\mathrm{desired} - |u-v|)^2$$

In some embodiments, to address the additional cost associated with a new build, the test scheduler may "penalize" those revisions that are ideal-revisions but not on the HaveList. Since the selecting of these revisions as optimal revisions may request new builds, the test scheduler may add a penalty to the weight, in order to take the additional cost of new builds into consideration. Thus, the following cost function may be tuned by including a penalty adjuster k:

$$\mathrm{highcost}(u,v) = \mathrm{cost}(0,0)*k + \mathrm{cost}(u,v)$$

Specifically, the penalty added to the total cost is cost(0, 0)*k, which is equivalent to k*desired$^2$.

In some embodiments, the test scheduler may apply the following trimming criteria to trim edges from the graph 301. Specifically, since the direction of an edge represents a testing order between two revisions, the edge can only be directed from a low number vertex on one tier to a high number vertex on the subsequent tier. Thus, the test scheduler shall remove any edges directing from a high number vertex to a low number vertex (e.g., an edge from vertex 323 to vertex 331). Second, the test scheduler must remove any vertices that do not have sufficient number of subsequent vertices that can be placed on each of the subsequent tiers. In other words, if a vertex representing revision 35 is placed on tier 1, then there can only be one subsequent vertex representing revision 40. Since this one vertex for revision 40 can only be placed on tier 2, no additional vertices can be placed on subsequent tiers 3-5. Thus, the vertex representing revision 35 cannot be placed on tier 1. Such a criterion may ensure there are enough future candidates to correspond to the number of ideal-revisions required for the IdealList.

In some embodiments, the test scheduler may exclude those vertices having edges that exceed a "weight threshold." For example, the test scheduler may configure a weight threshold equaling cost(0, 0)*k, or k*desired$^2$, and any vertices that are "pointed to" by those directed edges having weights exceeding the weight threshold may be eliminated for candidate consideration. Thus, when the ideal distance is 7, and k equals 2, the weight threshold equals 2*7*7=98. Such an approach may eliminate paths that introduce noise into the graph, and may reduce the computational complexity of the graph during subsequent best-choices selection.

For example, based on the HaveList and IdealList of Table 3 above, the test scheduler may create the initial vertex 310, and assign a value of zero to the initial vertex 310. The test scheduler may then determine the candidates suitable to be placed on tier 1 of the graph 301. In this case, the test scheduler may determine that revisions 30 and 40 in the HaveList, and revisions 28 and 35 in the IdealList would NOT lead to 5 subsequent revisions that can be placed on all five tiers. As a result, revisions 30 and 40 as well as revisions 28 and 35 cannot be candidate for tier 1. Further, the test scheduler may determine that revisions 20 and 25 in the HaveList, as well as revision 21 in the IdealList would generate edges with weights exceeding the weight threshold of 98, thus should not be included as tier 1 candidates either. After the above trimming process, the test scheduler may construct tier 1 vertices corresponding to revisions 5, 10, 13 and 15 from the HaveList, as well as revisions 7 and 14 from the IdealList. Further, the test scheduler may draw directed edges (e.g., edges 311, 312, 313, 314, 315, and 316) from the initial vertex 310 to these vertices.

Afterward, the test scheduler may construct tier 2, which is the next tier, of the graph 301. For example, the valid candidates for tier 2 may include candidates following the candidates on tier 1. With respect to candidate 5 on tier 1, the suitable candidates may include revisions 7, 10, 13, 14, and 15. Any additional candidates following candidate 5 may lead to edges having weights exceeding the weight threshold or lead to no sufficient candidates for all tiers. Likewise, the test schedulers may evaluate the candidates that follow candidate 7, and determine the suitable candidates for candidate 7 may include revisions 7 10, 13, 14, 15, and 21. After all the suitable candidates are collected, the test scheduler may construct the tier 2 vertices. Even though a revision may be a suitable following candidate for multiple candidates in tier 1, the test scheduler may create one vertex for this revision, and draw multiple edges from the multiple candidates in tier 1. For example, the vertex 332 may be suitable candidate for candidates represented by vertices 321 and 322. In this case, the test scheduler may create two edges from vertices 321 and 322 to the vertex 332 respectively. For simplicity purpose, not all candidates for tier 2 are shown as vertices in FIG. 3.

In some embodiments, the test engine may draw edges from vertices in tier 1 to vertices in tier 2. Specifically, the test engine shall draw edges from vertex 321 to those vertices associated with the revisions following revision 5 (e.g., vertices 331, 332, 333, 334, and 335). Please note for clarity purposes, not all edges are shown in FIG. 3. For example, not all edges from vertices 324, 325, and 326 to the tier 2 vertices are drawn. Once all tiers are completed, the test engine may construct the Final vertex 360, and draw edges from vertices in tier 5 to the final vertex 360. The test engine may also assign weights from the vertices in tier 5 to the final vertex 360. The weight may be calculated based on a distance between the last revision in the IdealList and an imaginary revision. In this example, the imaginary revision may be revision 42, which is an ideal distance away from the last revision 35 in the IdealList.

In some embodiments, after the test scheduler constructed vertices for each tier of the graph 301, connected the vertices with directed edges, assigned weights to the directed edges, and trimmed edges and vertices according to trimming criteria, the test engine may utilize a shortest path algorithm to determine a list of optimal revisions for the IdealList. A path may refer to a route from the initial vertex to the final vertex following the directed edges. Since each edge weight indicates a deviation from the ideal distance, the accumulated weights may be the sum of squares of the differences from the ideal distance. Thus, the sum of the weights may have a correlation with the variance from the equidistance associated with IdealList. Thus, the approach to find the smallest variance may be transformed into finding a shortest path in the graph 301. Since a shortest path may be a path having the smallest sum of weights, the smallest sum of weights may be used as a measure of "the most equidistant" revisions for the IdealList. Thus, the test engine may utilize a Dijkstra's shortest path algorithm to find the shortest path, and the vertices obtained by traversing the shortest path may produce a list of optimal revisions corresponding to the IdealList.

FIG. 4 illustrates sample source codes associated with prefetching builds during regression triage, according to one or more embodiments of the present disclosure. A triaging engine (similar to the triage engine 170 of FIG. 1) may be configured to pre-fetch builds during binary search. Using binary search to identify regression revision can be a slow process, since each iteration in the recursive binary search may require the creating of addition builds. The builds may also depend on whether regression is identified on earlier half or on latter half of the revision range.

In some embodiments, the triaging engine may schedule ahead and queue the creation of builds before the previous iteration of testing is completed. Specifically, the triaging engine may evaluate the revision range and determine a first middle revision for regression identification. Concurrently, the triaging engine may model a regression situation (in which regression is found in the middle revision) and a pass situation (in which regression is not found in the middle revision) by pre-scheduling the creating of two builds for each of the regression situation and the pass situation. Such pre-scheduling/pre-fetching of the builds may increase the speed of the binary search by having the builds for subsequent iteration ready sooner.

In some embodiments, the pre-fetching may be conducted two or more iterations ahead, so that the triaging engine may schedule the creation of additional builds. For example, The triaging engine may create 2 builds (one build for the regression situation and the other build for the pass situation) for the first iteration of pre-fetching ahead, and create 4 additional builds (two more builds for the regression situation, and two more builds for the pass situation) for second iteration of pre-fetching ahead. In other words, two-iteration pre-fetching may create 2+4=6 total builds ahead, with 2 of the builds being used eventually and the remaining 4 being "wasted/not tested." Similarly, the pre-fetching may perform multiple iterations ahead, with each additional iteration creating double number of pre-fetched builds associated with the iteration. For example, three-iteration pre-fetching may create 2+4+8=14 builds ahead, with 3 of the builds being used eventually and the remaining 11 being "wasted/not tested." In some embodiments, the "wasted/not tested" builds may be reusable by subsequent testing tasks conducted in any of the testbeds.

As shown by the Table 5 below, the triaging engine may start the regression identification process based on a list of revisions. The:

TABLE 5

Revisions = [R1, R2, R3, R4, R5, R6, R7, R8]

FIG. 4 provides a sample python source code for generating 2 prebuilds for the above list of revisions. Specifically, the triaging engine may perform the function "next_build" in FIG. 4 to identify a middle revision in the list of revisions shown in Table 5. Afterward, the sample code in FIG. 4 may create (or queue the creating of) two builds, one for the non-regression/pass situation and one for the regression situation. During a subsequent iteration of binary search, the triaging engine may select one of the two builds for usage, depending on whether the testing indicates a regression situation or a pass situation.

Figure 5:
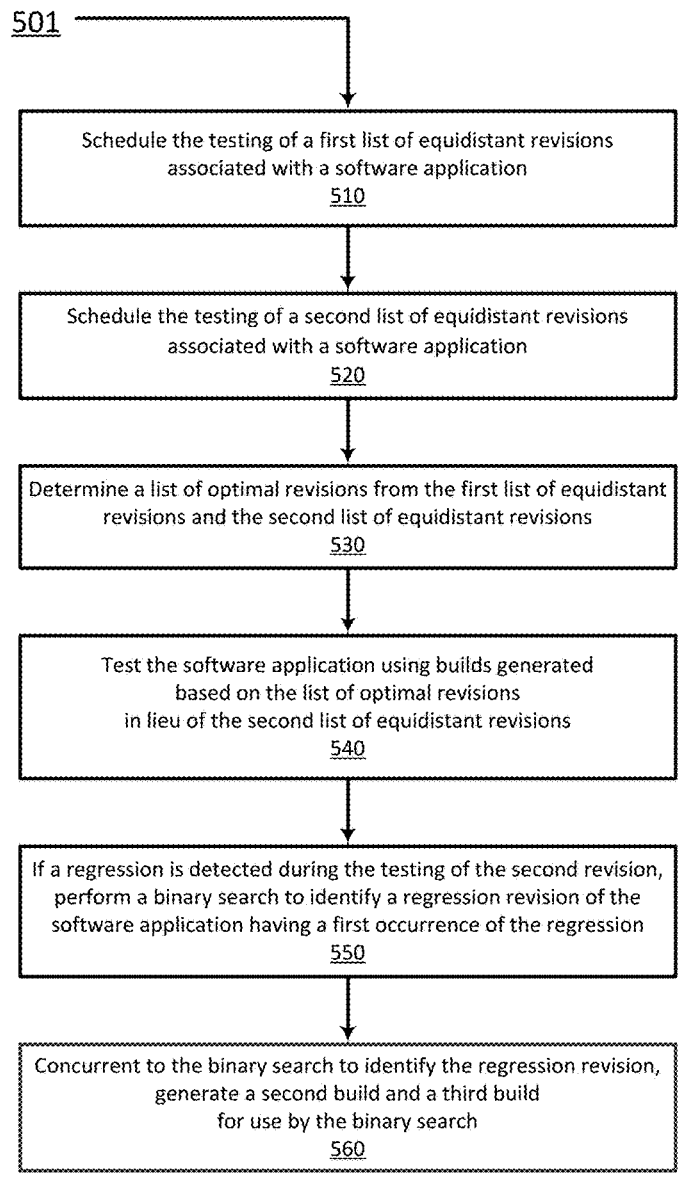
FIG. 5 shows a flow diagram illustrating a process to perform optimized tracking and triaging for detecting regressions, according to one or more embodiments of the present disclosure.

FIG. 5 shows a flow diagram illustrating a process to perform optimized tracking and triaging for detecting regressions, according to one or more embodiments of the present disclosure. The processes 501 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a test scheduler of an automated testing environment may be configured to schedule the testing of a first list of equidistant revisions associated with a software application. A test engine of the automated testing environment may be configured to start creating builds or queuing the creation of builds for the first list of equidistant revisions. The software application may have multiple revisions during a test cycle. The first list of equidistant revisions may be selected from the set of revisions that have been checked into a SCCS over recent predetermined period of time; the number of revisions in the list is based on the run time of the tests and the selection is such that the revisions in the list are equidistant. In some embodiments, the equidistant revisions may have revision numbers that can be divided by a common factor equaling the first equidistance. The test scheduler may be configured to perform a first testing task using the first list of equidistant revisions. Thus, the test scheduler may determine the first equidistance based on the time to complete the first testing task and the number of multiple revisions during the test cycle.

At block 520, the test scheduler may schedule the testing of a second list of equidistant revisions associated with the software application. The second list of equidistant revisions may be selected from the multiple revisions based on a second equidistance. The test scheduler may be configured to perform a second testing task using the second list of equidistant revisions. Thus, the test scheduler may determine the second equidistance based on the time to complete the second testing task and the number of multiple revisions during the test cycle. Further, the first equidistance may not be equal to the second equidistance.

At block 530, the test engine may determine a list of optimal revisions from the first list of equidistant revisions and the second list of equidistant revisions. In some embodiments, the test engine may determine a corresponding equidistance between a first revision selected from the first list of equidistant revisions and a second revision selected from the second list of equidistant revisions. If the corresponding equidistance is below a predetermined threshold, the test engine may add the first revision to the list of optimal revisions.

At block 540, the test engine may test the software application using builds generated based on the list of optimal revisions in lieu of the second list of equidistant revisions. Specifically, if an optimal revision in the list of optimal revisions exists in the first list of equidistant revisions, then the test engine may have already created (or queued the creation of) a build associated with the optimal revision during the testing of the first list of equidistant revisions. Thus, the test engine may reuse this build during the testing of the second list of equidistant revisions.

At block 550, if a test result analysis engine detects a regression in the test results/outcomes generated during the testing of a specific revision, the test result analysis engine may utilize a triaging engine to identify a regression revision of the software application having a first occurrence of the regression. Specifically, the triaging engine may utilize a binary search in identifying the regression revision. In some embodiments, the triaging engine may first identify a non-regressing revision of the software application. The triaging engine may select a first middle revision between the non-regressing revision and the specific revision showing regression.

In some embodiments, if the triaging engine detects regression when testing the first middle revision, it may perform recursive binary searches based on the non-regressing revision and the first middle revision until the regression revision is identified. If the triaging engine does not detect regression when testing the first middle revision; it may perform recursive binary search based on the first middle revision and the second revision until the regression revision is identified.

At block 560, concurrent to the testing of the middle revision, the triaging engine may perform pre-building and pre-fetching to generate a second build and a third build that may be used during a subsequent iteration of the binary search. Specifically, the second build is based on a second middle revision between the non-regressing revision and the first middle revision, the third build is based on a third middle revision between the first middle revision and the specific revision. In some embodiments, if the triaging engine detects the regression when testing the first middle revision, it may use the second build, which is previously created, in identifying the regression revision. Likewise, if the triaging engine does NOT detect the regression when testing the first middle revision, it may use the third build, which is previously created as well, in identifying the regression revision.

Figure 6:
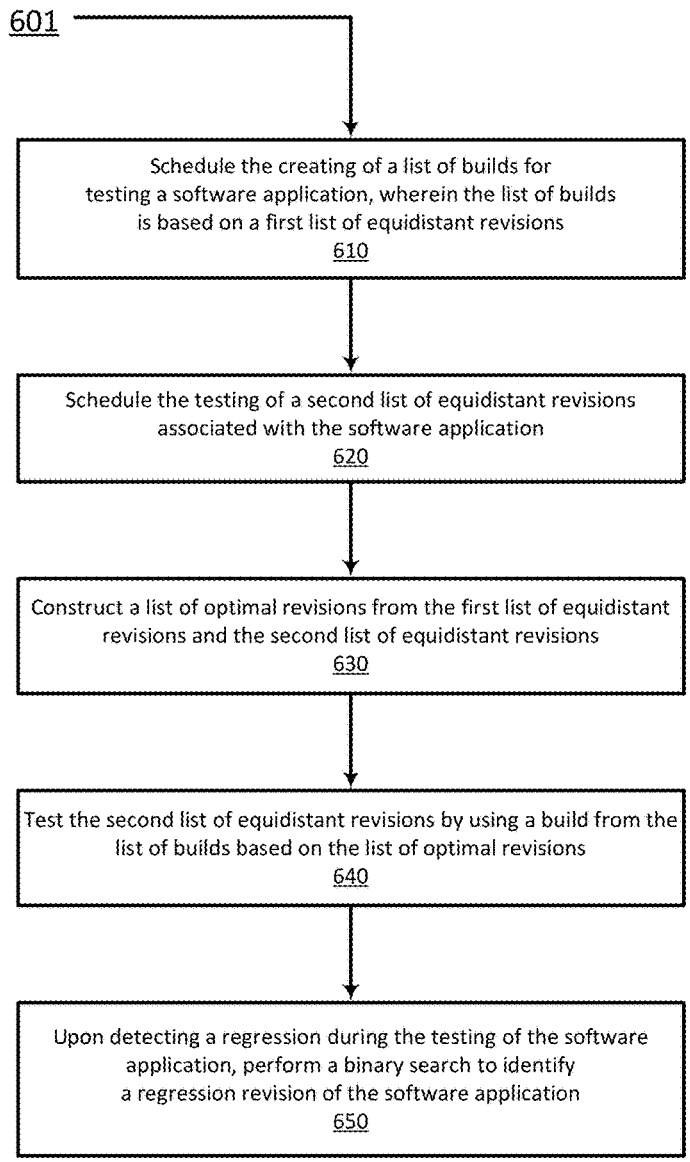
FIG. 6 shows a flow diagram illustrating another process to perform optimized tracking and triaging for detecting regressions, according to one or more embodiments of the present disclosure.

FIG. 6 shows a flow diagram illustrating another process to perform optimized tracking and triaging for detecting regressions, according to one or more embodiments of the present disclosure. The processes 601 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 610, a test scheduler in an automated testing environment may be configured to schedule the creating of a list of builds for testing a software application. A test engine of the automated testing environment may be configured to start creating, or queue the creation of, the list of builds based on a first list of equidistant revisions. The software application may have multiple revisions during a test cycle. The first list of equidistant revisions may be selected from the multiple revisions based on a first equidistance.

At block 620, the test scheduler may schedule the testing of a second list of equidistant revisions associated with the software application. The second list of equidistant revisions may be selected from the multiple revisions based on a second equidistance.

At block 630, the test engine may construct a list of optimal revisions from the first list of equidistant revisions and the second list of equidistant revisions. The list of optimal revisions may have the least variance from the second equidistance associated with the second list of equidistant revisions.

In some embodiments, for a specific revision selected from the first list of equidistant revisions and a scheduled revision selected from the second list of equidistant revisions, the test engine may determine a corresponding equidistance between the specific revisions and the scheduled revision. Upon a determination that the corresponding equidistance is below a predetermined threshold, the test engine may add the specific revision to the list of optimal revisions.

In some embodiments, the test engine may identify a tuple of candidate revisions corresponding to the scheduled revision from the first list of equidistant revisions for having equidistances that are below the predetermined threshold. In other words, each candidate revision in the tuple of candidate revisions may have a corresponding equidistance from the scheduled revisions that is below the predetermined threshold. Afterward, the test engine may select the list of optimal revisions from the tuple of candidate revisions and the second list of equidistant revisions. Specifically, the test engine may construct a Cartesian product having multiple permutations based on the tuples of candidate revisions and the second list of equidistant revisions. The test engine may then select the list of optimal revisions from the multiple permutations for having the least variance from the equidistance associated with the second list of equidistant revisions.

In some embodiments, the test engine may construct a graph based on the first list of equidistant revisions and the second list of equidistant revisions. In the graph, each vertex represents a candidate revision selected from the first list of equidistant revisions and the second list of equidistant revisions, and each edge in the graph connects two vertices and has a weight corresponding to a variance from the equidistance associated with the second list of equidistant revisions. Afterward, the test engine may identify a shortest path in the graph. The shortest path contains vertices that are associated with the list of optimal revisions. In other words, the test engine may generate the list of optimal revisions by traversing the shortest path and retrieving the revisions associated with the vertices on the shortest path.

In some embodiments, the test engine may calculate a weight for each of the edges in the graph based on a corresponding equidistance between two revisions that are associated with the two vertices connected via the edge. The test engine may add a build cost to the weight when one of the two revisions requires the creating of a new build. The test engine may further trim any edges from the graph for having weights that are above a predetermined weight threshold.

At block 640, the test engine may test the second list of equidistant revisions by using a build from the list of builds based on the list of optimal revisions. Specifically, if an optimal revision in the list of optimal revisions exists in the first list of equidistant revisions, then the build for the optimal revision may already exist in the list of builds. Thus, the test engine may reuse this build during the testing of the second list of equidistant revisions.

At block 650, if a test result analysis engine detects a regression in the test results/outcomes generated during the testing of the a specific revision, the test result analysis engine may utilize a triaging engine to identify a regression revision of the software application having a first occurrence of the regression. Specifically, the triaging engine may utilize a binary search in identifying the regression revision.

Thus, systems and methods for regression tracking and triaging have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A system configured to perform regression tracking and triaging, the system comprising a processor and memory coupled with the processor, wherein the memory is configured to provide the processor with instructions for:
    scheduling testing of a first list of equidistant revisions associated with a software application, wherein the equidistant revisions have a common difference in distance between two adjacent revisions in the first list;
    scheduling testing of a second list of equidistant revisions associated with the software application, wherein the equidistant revisions have a common difference in distance between two adjacent revisions in the second list; and
    for a first revision selected from the first list of equidistant revisions and a second revision selected from the second list of equidistant revisions, upon a determination that an equidistance between the first revision and the second revision is below a predetermined threshold, testing the second revision using a first build generated based on the first revision, wherein the first build is executable by the processor.

2. The system of claim 1, wherein the memory is further configured to provide the processor with instructions for:
    if a regression is detected during the testing of the second revision, performing a binary search to identify a regression revision of the software application having a first occurrence of the regression.

3. The system of claim 2, wherein the performing of the binary search comprising:
    identifying a non-regressing revision of the software application;
    selecting a first middle revision between the non-regressing revision and the second revision for testing; and
    if the regression is detected when testing the first middle revision, performing recursive binary search based on the non-regressing revision and the first middle revision until the regression revision is identified.

4. The system of claim 3, wherein the performing of the binary search further comprising:
    if the regression is not detected when testing the first middle revision, performing recursive binary search based on the first middle revision and the second revision until the regression revision is identified.

5. The system of claim 3, wherein the performing of the binary search further comprising:
    concurrent to the testing of the middle revision, generating a second build and a third build, wherein the second build is based on a second middle revision between the non-regressing revision and the first middle revision, and the third build is based on a third middle revision between the first middle revision and the second revision;
    if the regression is detected when testing the first middle revision, using the second build in identifying the regression revision; and
    if the regression is not detected when testing the first middle revision, using the third build in identifying the regression revision.

6. A method for a processor to perform regression tracking and triaging, the method comprising:
    scheduling testing of a first list of equidistant revisions associated with a software application, wherein the equidistant revisions have a common difference in distance between two adjacent revisions in the first list;
    scheduling testing of a second list of equidistant revisions associated with the software application, wherein the equidistant revisions have a common difference in distance between two adjacent revisions in the second list; and
    for a first revision selected from the first list of equidistant revisions and a second revision selected from the second list of equidistant revisions, upon a determination that an equidistance between the first revision and the second revision is below a predetermined threshold, testing the second revision using a first build generated based on the first revision, wherein the first build is executable by the processor.

7. The method of claim 6, further comprising:
    if a regression is detected during the testing of the second revision, performing a binary search to identify a regression revision of the software application having a first occurrence of the regression.

8. The method of claim 7, wherein the performing of the binary search comprising:
    identifying a non-regressing revision of the software application;
    selecting a first middle revision between the non-regressing revision and the second revision for testing; and
    if the regression is detected when testing the first middle revision, performing recursive binary search based on the non-regressing revision and the first middle revision until the regression revision is identified.

9. The method of claim 8, wherein the performing of the binary search further comprising:
    if the regression is not detected when testing the first middle revision, performing recursive binary search based on the first middle revision and the second revision until the regression revision is identified.

10. The method of claim 8, wherein the performing of the binary search further comprising:
    concurrent to the testing of the middle revision, generating a second build and a third build, wherein the second build is based on a second middle revision between the non-regressing revision and the first middle revision, and the third build is based on a third middle revision between the first middle revision and the second revision;
    if the regression is detected when testing the first middle revision, using the second build in identifying the regression revision; and
    if the regression is not detected when testing the first middle revision, using the third build in identifying the regression revision.

11. A non-transitory computer-readable storage medium, containing a set of instructions which, in response to execution by a processor, cause the processor to perform a method for regression tracking and triaging, the method comprising:
    scheduling testing of a first list of equidistant revisions associated with a software application, wherein the equidistant revisions have a common difference in distance between two adjacent revisions in the first list;

scheduling testing of a second list of equidistant revisions associated with the software application, wherein the equidistant revisions have a common difference in distance between two adjacent revisions in the second list; and for a first revision selected from the first list of equidistant revisions and a second revision selected from the second list of equidistant revisions, upon a determination that an equidistance between the first revision and the second revision is below a predetermined threshold, testing the second revision using a first build generated based on the first revision, wherein the first build is executable by the processor.

12. The non-transitory computer-readable storage medium of claim 11, wherein the method further comprising:

if a regression is detected during the testing of the second revision, performing a binary search to identify a regression revision of the software application having a first occurrence of the regression.

13. The non-transitory computer-readable storage medium of claim 12, wherein the performing of the binary search comprising: identifying a non-regressing revision of the software application;

selecting a first middle revision between the non-regressing revision and the second revision for testing; and if the regression is detected when testing the first middle revision, performing recursive binary search based on the non-regressing revision and the first middle revision until the regression revision is identified.

14. The non-transitory computer-readable storage medium of claim 13, wherein the performing of the binary search further comprising:

if the regression is not detected when testing the first middle revision, performing recursive binary search based on the first middle revision and the second revision until the regression revision is identified.

15. The non-transitory computer-readable storage medium of claim 13, wherein the performing of the binary search further comprising:

concurrent to the testing of the middle revision, generating a second build and a third build, wherein the second build is based on a second middle revision between the non-regressing revision and the first middle revision, and the third build is based on a third middle revision between the first middle revision and the second revision;

if the regression is detected when testing the first middle revision, using the second build in identifying the regression revision; and if the regression is not detected when testing the first middle revision, using the third build in identifying the regression revision.

* * * * *